June 13, 1933.  E. A. KOHN  1,913,398
COFFEE MAKING APPARATUS
Filed July 3, 1931
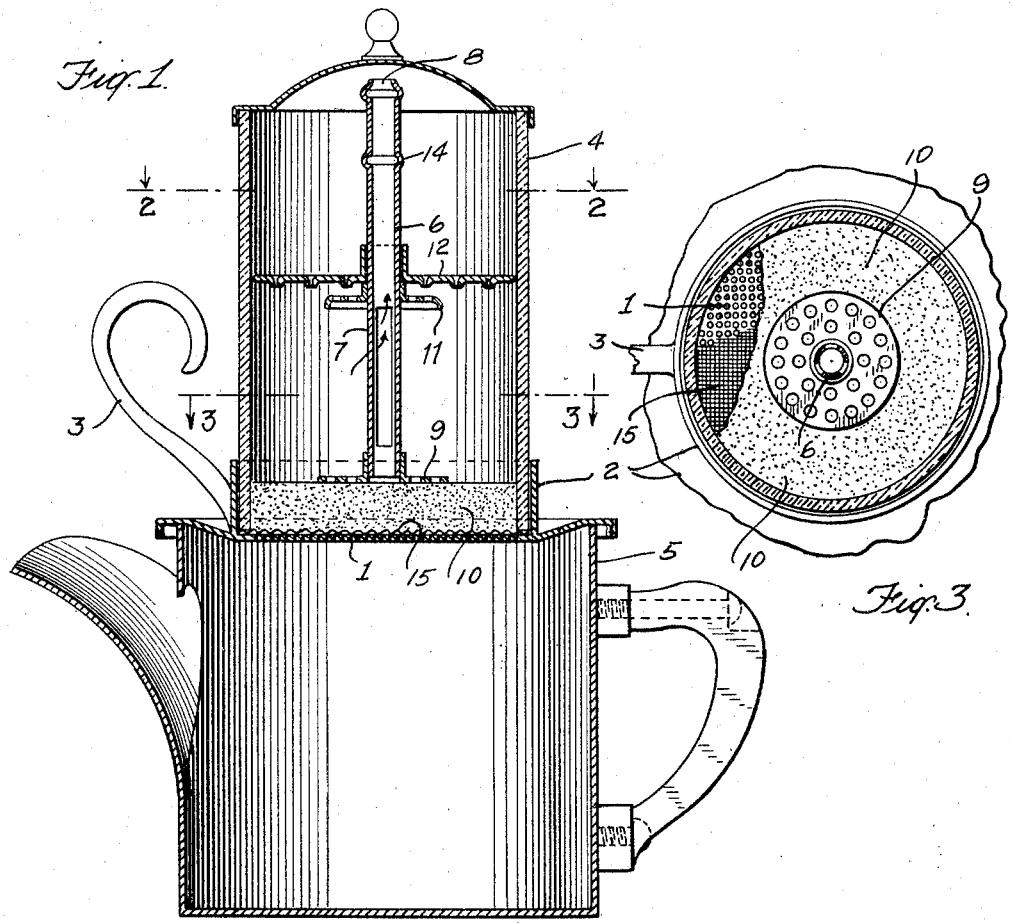
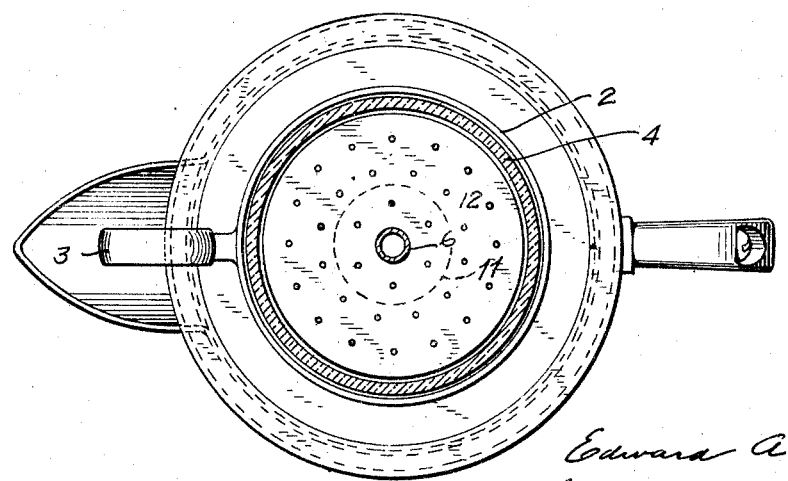
INVENTOR
Edward A. Kohn
BY his ATTORNEYS
Janney Blair Curtis Patented June 13, 1933

1,913,398

UNITED STATES PATENT OFFICE

EDWARD A. KOHN, OF NEW YORK, N. Y.

COFFEE MAKING APPARATUS

Application filed July 3, 1931. Serial No. 548,504.

The present invention relates to an improvement in coffee making apparatus. One object thereof has been to provide a coffee making device of relatively simple construction which, in operation, will utilize what has been recognized as the proper principle to be employed in the making of coffee beverage from the coffee bean. One important factor in producing a coffee beverage of desirable quality is the operation of leaching out the aromatic flavoring or essential oils of the ground coffee without dislodging or leaching undesirable components which are perceptible in the beverage by reason of their relatively bitter taste. In general, this result is achieved by pouring water of approximately boiling temperature over a supply of finely ground coffee and in such proportions that the heated water will leach through the coffee and be discharged within a space of approximately two minutes. This is generally referred to as the "drip process". An object of the present invention has been to provide a simplified mechanism for making drip coffee and for insuring the quality of the results, assuming that a properly ground coffee is provided.

It is known that coffee has been made in apparatus in which the ground coffee is supported on or within a foraminous member, such as a sieve, strainer, fabric bag or the like. However, there is frequently an undesirable delay in the passage of the heated water through the ground coffee, while in other cases the water passes too rapidly through the ground coffee or through only a portion thereof, so that the full flavoring value of the ground coffee supply is not utilized. According to my invention, it is contemplated that when the heated water is poured into the coffee making apparatus with a proper supply of finely ground coffee therein, the leaching effect of the water will be uniformly distributed throughout the supply of coffee; and means are provided to permit the escape of air from below the vicinity of the ground coffee supply. In previously known devices, it sometimes happens that air entrapped under the charge of water suddenly erupts and causes overflow, not only of the water, but also of the ground coffee.

A further object of my invention has been to provide a combined flow equalizer and vent for coffee making apparatus whereby the charge of heated water is evenly distributed over and fed to the supply of finely ground coffee below, and whereby air entrapped under the equalizing device is permitted to escape through a suitable vent or conduit, and whereby dislodged or erupted coffee is also vented and returned to the container without disturbing or stopping the flow or continued distribution of the heated water, or otherwise interfering with the contemplated operation of the apparatus.

A preferred form of apparatus embodying my invention is illustrated in the drawing accompanying the present application and in which Figure 1 is a central vertical section;

Figure 2, a transverse section on the line 2—2 of Figure 1, and

Figure 3, a transverse section on the line 3—3 of Figure 1.

Referring to the drawing, wherein a preferred form of my improved coffee making apparatus is shown in operative relation to a coffee beverage pot or holder, said apparatus includes a container having a perforated bottom wall and a removable combined flow equalizer and vent. In the illustrated embodiment the container includes a separate bottom member provided with a bottom wall having a perforated portion at 1, surrounded by an annular flange 2. A handle 3 is attached at any suitable place, as to the annular flange 2. The container also includes a side wall member 4, preferably in the form of a glass tube or the like adapted to fit snugly into the opening of the annular flange 2 and to rest upon the upper surface of the bottom wall and surrounding the perforated portion 1. The bottom wall may be formed in any suitable manner, preferably so as to fit readily upon the top edge of a cup or coffee pot 5.

My improved coffee making apparatus also includes what I designate as a combined flow equalizer and vent. This element in the illustrated form includes a removable tube or conduit 6 having an inlet opening 7 and an outlet opening 8, said opening 7 being spaced from the lower end of the tube 6. The latter is provided with a bottom supporting member or foot 9 adapted to rest upon a leveled supply of ground coffee 10 which, in operation of the device, rests loosely upon the upper surface of the perforated portion 1. The tube 6 carries a baffle or apron 11, arranged just above the opening 7 and adapted to facilitate the passage of air, water, and/or ground coffee through the vent tube under varying conditions of operation. The tube 6 also carries a flow equalizing member including a perforated plate 12 or the like arranged to move vertically in relation to the tube 6 along with a spacing collar 13 slidably mounted on the tube, above the upper surface of the apron 11. To limit the extent of upward movement of the perforated equalizer plate 12, a suitable stop device is provided, shown in Figure 1 as an annular protruding ridge 14, in the tube 6.

In operation, the bottom member of my apparatus is seated on a cup or other suitable container for coffee beverage. If desired a filter paper 15 is laid over the perforated portion 1. The upright portion 4, preferably of glass, is placed in operative position with its lower edge portion resting upon the bottom member as previously described. A supply of finely ground, but not pulverized, coffee is then deposited to rest upon the perforated portion 1 or on the filter paper 15 if desired. In general, a tablespoon of very finely ground coffee will be sufficient for the making of the usual size cup of coffee beverage. The combined flow equalizer and vent is now placed in position with its supporting base or foot 9 resting upon the top surface of the leveled supply of coffee. It is desirable that the foot 9 shall present no greater obstructive area to the passage of water into the ground coffee than is necessary to readily support the vent tube on top of the supply. The water required for leaching the aromatic and/or essential ingredients from the ground coffee, having been previously heated to approximately boiling temperature, is now poured slowly into the container 4 and is evenly distributed upon the perforated membar 12, which through its plurality of openings equalizes the flow of water downwardly over substantially the entire mass of the ground coffee. Where air is imprisoned below the water as it spreads over the plate 12, a convenient means of discharge is provided through the opening 7, tube 6 and discharge opening 8. Where the discharge of air through the vent is accompanied by an eruption of water, with or without ground coffee mixed therein, the discharged material is returned to the upper surface of the equalizer and the liquid component again drips through into the space below and eventually into the cup or container 5.

With the use of my improved apparatus, coffee connoisseurs are spared the frequent disappointments occasioned by coffee making processes and devices in which the quality of the product depends in greater degree upon the skill of the cook. There is no variable factor in my apparatus or in its mode of operation except the quality of the coffee. In other words, given a uniform quality of coffee used in proper amount, my apparatus produces a uniformly satisfactory coffee beverage to suit the individual taste.

The usual variations in size and details of construction are contemplated in various embodiments to meet different marketing and use conditions without, however, departing from the intended scope of my invention.

I claim:

1. In coffee making apparatus the combination of a container having a perforated bottom wall upon which to support a supply of ground coffee, a combined vent and flow equalizer removably supported on the coffee supply and comprising a tube and a perforated distributing member slidable thereon, said tube having an inlet opening below said member and a discharge opening above said member.

2. In coffee making apparatus the combination of a container having a perforated bottom wall upon which to support a supply of ground coffee, a combined vent and flow equalizer removably supportable on the coffee supply and comprising a tube provided with an inlet opening spaced from its lower end, a baffle fixed on said tube above said opening, a collar slidably mounted on the tube above said baffle and a perforated plate spaced above the baffle by said collar and movable therewith in relation to said tube.

3. In coffee making apparatus the combination of a container having a perforated bottom, a flow equalizer comprising a hollow support removably arranged in the container entirely above said perforated bottom wall and a perforated plate slidably mounted on said support for limited up and down movement in relation to vertical wall portions of the container, said hollow support having an inlet opening below said perforated plate and a discharge opening above said plate to operate as a vent when water is poured on the plate in making coffee.

4. In coffee making apparatus, the combination of a container comprising a perforated bottom wall for supporting a supply of ground coffee, a body member removably positioned on said wall, a flow equalizer removably arranged in the container and including a conduit provided with inlet and outlet openings, a distributor member slidably mounted on said conduit between said openings, and means for limiting the extent of movement of said distributor member.

5. Coffee making apparatus comprising a bottom member having a perforated central portion, an annular flange arranged in substantially upright relation to said bottom member and surrounding said central perforated portion, and a cylindrical glass tube open at both ends and having terminal edge portions adapted to removably and interchangeably rest upon the bottom member with portions of its exterior surface frictionally engaging interior surfaces of said annular flange.

6. Coffee making apparatus comprising a bottom member having a perforated central portion, an annular flange arranged in substantially upright relation to said bottom member and surrounding said central perforated portion, a removable filter element supported on the bottom member and covering said perforated portion, and a cylindrical glass tube open at both ends and having end edge portions adapted to interchangeably and removably engage said flange and to present an edge resting upon peripheral portions of said filter element to retain the same in operative position with respect to the perforated centrol portion of the bottom member.

7. A combined venting and flow equalizing device for use with coffee making apparatus comprising an upright hollow stem provided at its upper end with an outlet opening, at its lower end with a laterally extending stem supporting member, and having an inlet opening through a lower end portion of its wall above said supporting member, a perforated distributor plate slidably mounted on said stem, and means operatively positioned in relation to the plate and the stem to limit the extent of sliding movement of the plate in both directions on said stem.

In testimony whereof, I have signed my name to this specification this 1st day of July, 1931.

EDWARD A. KOHN.

CERTIFICATE OF CORRECTION.

Patent No. 1,913,398.  June 13, 1933.

EDWARD A. KOHN.

It is hereby certified that error appears in the printed specification of the above numbered patent requiring correction as follows: Page 2, line 90, claim 1, for "supported" read "supportable"; page 3, line 29, claim 6, for "centrol" read "central"; and that the said Letters Patent should be read with these corrections therein that the same may conform to the record of the case in the Patent Office.

Signed and sealed this 22nd day of August, A. D. 1933.

(Seal)

M. J. Moore.
Acting Commissioner of Patents.